(12) United States Patent
Ghosh et al.

(10) Patent No.: US 11,541,639 B2
(45) Date of Patent: Jan. 3, 2023

(54) LOW OUTGASSING CLEAN ADHESIVE (71) Applicant: Avery Dennison Corporation, Glendale, CA (US)

(72) Inventors: Nippon Ghosh, Glendale, CA (US); Sudarshana Mukherjee, Glendale, CA (US); Dhananjay Patil, Glendale, CA (US); Suman Majumder, Glendale, CA (US)

(73) Assignee: Avery Dennison Corporation, Glendale, CA (US)

( * ) Notice: Subject to any disclaimer, the term of this patent is extended or adjusted under 35 U.S.C. 154(b) by 351 days.

(21) Appl. No.: 16/159,539

(22) Filed: Oct. 12, 2018

(65) Prior Publication Data
US 2019/0144720 A1 May 16, 2019

(30) Foreign Application Priority Data
Oct. 12, 2017 (IN) .............................. 201711036351

(51) Int. Cl.
| B32B 15/09 | (2006.01) |
| C09J 131/04 | (2006.01) |
| B32B 27/30 | (2006.01) |
| C09J 7/38 | (2018.01) |
| C09J 4/06 | (2006.01) |
| C08F 218/08 | (2006.01) |
(Continued)

(52) U.S. Cl.
CPC ............ *B32B 15/09* (2013.01); *B32B 27/306* (2013.01); *C09J 4/06* (2013.01); *C09J 7/38* (2018.01); *C09J 7/381* (2018.01); *C09J 131/04* (2013.01); *C08F 216/06* (2013.01); *C08F 218/08* (2013.01); *C08F 220/10* (2013.01); *C08F 2800/20* (2013.01); *C09J 2203/334* (2013.01); *C09J 2301/414* (2020.08); *C09J 2431/00* (2013.01); *C09J 2433/00* (2013.01)

(58) Field of Classification Search
CPC ...................................... C09J 7/38; C09J 4/00
See application file for complete search history.

(56) References Cited

U.S. PATENT DOCUMENTS

| 4,296,225 A | 10/1981 | Rhum |
| 4,855,382 A | 8/1989 | Vanhaeren |
| 5,602,221 A | 2/1997 | Bennett et al. |
(Continued)

FOREIGN PATENT DOCUMENTS

| CN | 101291962 | 10/2008 |
| CN | 101353546 | 1/2009 |
(Continued)

OTHER PUBLICATIONS

Tobing—Molecular parameters-adhesive performance—J.Appl.Poly. Sci.—2001 (Year: 2001).*
(Continued)

*Primary Examiner* — John Vincent Lawler (57) ABSTRACT

Provided herein is a solvent-based pressure sensitive adhesive comprising a polymer comprising a vinyl acetate monomer, an acrylic ester monomer, and a monomer having hydroxyl or amine functionality. The adhesive also comprise a crosslinker. The coated and dried adhesive has outgassing of less than 2000 ng/cm$^2$, even when applied to an electronic device that is operated at elevated temperature.

5 Claims, 1 Drawing Sheet (51) Int. Cl.
  *C08F 216/06* (2006.01)
  *C08F 220/10* (2006.01)

(56) References Cited

U.S. PATENT DOCUMENTS

| | | | |
|---|---|---|---|
| 6,005,035 | A | 12/1999 | Raynolds et al. |
| 6,218,006 | B1 | 4/2001 | Tokunaga et al. |
| 6,432,529 | B1 | 8/2002 | Harder et al. |
| 6,448,337 | B1 | 9/2002 | Gaddam et al. |
| 6,613,870 | B1 | 9/2003 | Harder et al. |
| 6,624,223 | B1 | 9/2003 | Thames et al. |
| 6,663,958 | B2 | 12/2003 | Husemann et al. |
| 6,703,121 | B2 | 3/2004 | Iwabuchi et al. |
| 6,827,997 | B2 | 12/2004 | Sakurai et al. |
| 7,279,541 | B2 | 10/2007 | Centner et al. |
| 7,371,460 | B2 | 5/2008 | Okochi et al. |
| 7,374,815 | B2 | 5/2008 | Okochi et al. |
| 7,432,326 | B2 | 10/2008 | Husemann et al. |
| 7,498,456 | B2 | 3/2009 | Lai |
| 8,263,680 | B2 | 9/2012 | Luciano et al. |
| 8,945,710 | B2 | 2/2015 | Kishioka et al. |
| 9,034,140 | B2 | 5/2015 | Nishida et al. |
| 10,525,668 | B2 | 1/2020 | Furuta et al. |
| 2002/0132927 | A1 | 9/2002 | Gaddam et al. |
| 2002/0155244 | A1 | 10/2002 | Sakurai et al. |
| 2003/0088031 | A1 | 5/2003 | Husemann et al. |
| 2003/0113533 | A1* | 6/2003 | Husemann ........... C09J 7/22 428/343 |
| 2003/0204010 | A1 | 10/2003 | Iwata et al. |
| 2004/0092632 | A1 | 5/2004 | Schultz et al. |
| 2005/0037161 | A1 | 2/2005 | Castiglione et al. |
| 2006/0221447 | A1 | 10/2006 | Dizio et al. |
| 2007/0072986 | A1* | 3/2007 | Luciano ........... C09J 133/08 524/556 |
| 2008/0220252 | A1 | 9/2008 | Husemann et al. |
| 2009/0192232 | A1 | 7/2009 | Kim et al. |
| 2009/0192242 | A1 | 7/2009 | Willimann et al. |
| 2009/0324944 | A1 | 12/2009 | Toyama et al. |
| 2010/0124627 | A1 | 5/2010 | Nonaka et al. |
| 2010/0183872 | A1 | 7/2010 | Nonaka et al. |
| 2010/0209649 | A1 | 8/2010 | Kuwahara et al. |
| 2012/0231688 | A1 | 9/2012 | Tosaki et al. |
| 2013/0004749 | A1 | 1/2013 | Hao et al. |
| 2013/0211028 | A1 | 8/2013 | Shinike et al. |
| 2014/0007887 | A1 | 1/2014 | Joly et al. |
| 2014/0044961 | A1 | 2/2014 | Takami et al. |
| 2014/0088220 | A1 | 3/2014 | Havaux et al. |
| 2014/0220342 | A1 | 8/2014 | Schiro et al. |
| 2015/0037560 | A1* | 2/2015 | Dollase ........... C08L 53/02 428/220 |
| 2015/0165743 | A1* | 6/2015 | Horigome ........... B32B 37/18 156/249 |
| 2017/0101556 | A1 | 4/2017 | Keite-Telgenbuscher et al. |
| 2017/0204305 | A1 | 7/2017 | Houillot et al. |
| 2017/0253773 | A1* | 9/2017 | Furuta ........... B32B 7/12 |
| 2019/0300758 | A1* | 10/2019 | Kawazoe ........... B64D 11/00 |

FOREIGN PATENT DOCUMENTS

| | | | |
|---|---|---|---|
| CN | 101511961 | 1/2012 | |
| CN | 104371609 | 2/2015 | |
| CN | 103249791 | 5/2015 | |
| CN | 104927685 | 9/2015 | |
| CN | 107151535 | 9/2017 | |
| EP | 1072664 | 1/2001 | |
| EP | 1262503 | 12/2002 | |
| EP | 1262503 A1 * | 12/2002 | ......... C08G 18/3284 |
| JP | 2004-514016 | 5/2004 | |
| JP | 2004-182794 | 7/2004 | |
| JP | 2005/154531 * | 6/2005 | ............... C09J 7/38 |
| JP | 2005-154531 | 6/2005 | |
| JP | 2007-035750 | 2/2007 | |
| JP | 4047434 | 2/2008 | |
| JP | 4079659 | 4/2008 | |
| JP | 2010-037431 | 2/2010 | |
| JP | 4608759 | 1/2011 | |
| JP | 4682299 | 5/2011 | |
| JP | 2011-168568 | 9/2011 | |
| JP | 5091440 | 12/2012 | |
| JP | 5191080 | 4/2013 | |
| JP | 5231774 | 7/2013 | |
| JP | 2014-208467 | 11/2014 | |
| JP | 5628081 | 11/2014 | |
| KR | 100727018 | 6/2007 | |
| KR | 101073098 | 10/2011 | |
| WO | 2009/155115 | 12/2009 | |
| WO | 2013/167537 | 11/2013 | |
| WO | 2015060210 | 4/2015 | |
| WO | WO-2015060210 A1 * | 4/2015 | ............... C09J 7/38 |
| WO | 2017155644 | 9/2017 | |
| WO | WO-2017155644 A1 * | 9/2017 | ......... C09J 133/066 |

OTHER PUBLICATIONS

Iwabuchi—JP 2005-154531 A—IDS—MT—low gas-outing adhesive w-similar monomers—2005 (Year: 2005).*
Li—WO 2015-060210 A1—ISR D#2—MT—adhesive agent composition—2015 (Year: 2015).*
Sigma-Aldrich—Thermal Transitions of Homopolymers _ Sigma-Aldrich—Dec. 2020 (Year: 2020).*
PolymerDatabase—Poly(2-hydroxyethyl acrylate)—Dec. 2020 (Year: 2020).*
Fox Equation—Polymer Database (Year: 2020).*
Poly(2-hydroxyethyl acrylate)—Polymer Database—Sep. 22, 2021 (Year: 2021).*
Do—UV-crosslinkable_acrylic_PSA—acrylate+vinyl acetate+acid—wrong solvent—amount solids—J.Adhes.Sci.Tech—2006 (Year: 2006).*
ASTM E 595-93, Standard Test Method for Total Mass Loss and Collected Volatile Condensable Materials from Outgassing in a Vacuum Environment, Aug. 1993, 8 pages.
"International Search Report and Written Opinion" issued in PCT/US2018/055734, dated Dec. 10, 2018, 12 pages.
International Preliminary Report on Patentability dated Apr. 23, 2020 issued in corresponding IA No. PCT/US2018/055734 filed Oct. 12, 2018.

* cited by examiner

LOW OUTGASSING CLEAN ADHESIVE

CROSS-REFERENCE TO RELATED APPLICATION

This application claims priority to Indian Application No. 201711036351, filed on Oct. 12, 2017, the entire contents and disclosure of which are incorporated herein.

FIELD OF THE INVENTION

The present invention relates generally to pressure sensitive adhesives and, in particular, to improved pressure sensitive adhesives that provide low outgassing.

BACKGROUND OF THE INVENTION

Pressure-sensitive adhesives (PSAs) are known to provide adhesiveness or tack to various substrates when applied at room temperature. This adhesiveness can provide for instantaneous adhesion to the substrate when pressurized. PSAs are easy to handle in solid form, quickly form adhesive bonds without significant supplementary processing, and generally have a long shelf life. PSAs are also generally known to provide a convenient and economical way to label articles of commerce such as electronic devices. Such electronic devices, however, require that the PSA be a low outgassing PSA, e.g., a PSA that generates low amounts of pollutants, such as volatile organic components (VOCs), especially at elevated temperatures. If the PSA has relatively high levels of outgassing, the residues of the solvent and residual monomers of the PSA may evaporate out of the PSA when the electronic component reaches an elevated temperature. Such outgassing may result in short circuiting of the electronic devices.

Conventionally, pressure-sensitive adhesives are mainly rubber or acrylic solvent-based pressure-sensitive adhesives, and VOCs have been used as diluting solvents in the processes for producing them. One solution to reducing outgassing in PSAs is to use water-based PSAs. For example, US Pub. No. 2012/0231688 describes a pressure-sensitive adhesive tape having a substrate and a pressure-sensitive adhesive layer formed from a water-dispersible pressure-sensitive adhesive on at least one surface of the substrate, which has a back face-holding force of 2.0 mm or less at 100° C.

US Pub. No. 2009/0192232 an aqueous dispersion and dispersion powder composition for highly flexible, waterproof, hydraulically binding tile adhesives having an extended open time, and containing an emulsion polymer (A) having a glass transition temperature ($T_g$) of approximately 10° C. to 80° C., and an emulsion polymer (B) having a glass transition temperature ($T_g$) of approximately −60° C. to +20° C. The difference of the glass transition temperatures ($T_g$) of the emulsion polymers (A and B) is at least approximately 5° C. The proportion of vinyl acetate monomer units is 0 to 70 mol-% and the minimum film forming temperature according to DIN 53787 of the 50% aqueous dispersion composition is approximately 15° C. or less, and the monomers, stabilization systems and optionally the additional additives of the dispersion and/or dispersion powder composition are selected such that a good cement compatibility is guaranteed. Due to the inventive dispersion and dispersion powder composition, tile adhesive can be produced in an economical manner which meets the requirements of C2S2- and C2ES2-norm according to EN12004.

Water-based PSAs, however, are less desirable for producing low outgassing adhesives due to limitations of the components and a poorer level of crosslinking as compared to solvent-based PSAs. As a result, the need exists for improved solvent-based pressure sensitive adhesives that provide excellent adhesion and tack, while having low outgassing.

SUMMARY OF THE INVENTION

In one embodiment, the invention is directed to a solvent-based pressure sensitive adhesive formulation comprising: a polymer comprising a vinyl acetate monomer, an acrylic ester monomer, and a monomer having a hydroxyl or amine functionality; a solvent; and a crosslinker. The polymer may have a glass transition temperature from −40 to −10° C. The polymer may have a weight average molecular weight from 25,000 to 400,000 g/mol. The polymer may have a number average molecular weight from 25,000 to 400,000 g/mol. The polymer may have a polydispersity index from 1 to 10. The polymer may be present from 10 to 60 wt. %, based on the total weight of the formulation. The polymer may comprise from 10 to 90 wt. % polyvinyl acetate monomer, based on the total weight of the polymer. The polymer may comprise from 10 to 40 wt. % acrylic ester monomer, based on the total weight of the polymer. The polymer may comprise from 5 to 50 wt. % monomer having a hydroxyl or amine functionality, based on the total weight of the polymer. The crosslinker may be present from 0.05 to 5 wt. % based on the total weight of the formulation. The solvent may be present from 40 to 90 wt. %, based on the total weight of the formulation.

In another embodiment, the present invention is directed to a solvent-based pressure sensitive adhesive comprising a polymer and a crosslinker, wherein the polymer comprises a vinyl acetate monomer, an acrylic ester monomer, and a monomer having a hydroxyl or amine functionality; and further wherein the adhesive release less than 2000 ng/cm² outgas as measured according to ASTM E 595 (1993). The polymer may have a glass transition temperature from −40 to −10° C. The polymer may have a weight average molecular weight from 25,000 to 400,000 g/mol. The polymer may have a number average molecular weight from 25,000 to 400,000 g/mol. The polymer may have a polydispersity index from 1 to 10. The polymer may comprise from 10 to 90 wt. % polyvinyl acetate monomer, based on the total weight of the polymer. The polymer may comprise from 10 to 40 wt. % acrylic ester monomer, based on the total weight of the polymer. The polymer may comprise from 5 to 50 wt. % monomer having a hydroxyl or amine functionality, based on the total weight of the polymer. The crosslinker may be present from 0.05 to 5 wt. %, based on the total weight of the adhesive.

In yet another embodiment, the present invention is directed to a label comprising: a film and a pressure sensitive adhesive layer comprising a polymer and a crosslinker, wherein the polymer comprises a vinyl acetate monomer, an acrylic ester monomer, and a monomer having a hydroxyl or amine functionality; and further wherein the adhesive release less than 2000 ng/cm² outgas as measured according to ASTM E 595 (1993). The polymer may have a glass transition temperature from −40 to −10° C. The polymer may have a weight average molecular weight from 25,000 to 400,000 g/mol. The polymer may have a number average molecular weight from 25,000 to 400,000 g/mol. The polymer may have a polydispersity index from 1 to 10. The polymer may comprise from 10 to 90 wt. % polyvinyl acetate monomer, based on the total weight of the polymer. The polymer may comprise from 10 to 40 wt. % acrylic ester monomer, based on the total weight of the polymer. The polymer may comprise from 5 to 50 wt. % monomer having a hydroxyl or amine functionality, based on the total weight of the polymer. The crosslinker may be present from 0.05 to 6 wt. %, based on the total weight of the adhesive. The adhesive layer may have a coating weight from 5 to 60 gsm. The adhesive may release less than 2000 ng/cm$^2$ outgas as measured according to ASTM E 595 (1993).

In another embodiment, the present invention is directed to a method for producing a pressure sensitive adhesive layer, the method comprising: providing a solvent, a crosslinker, and a polymer comprising a vinyl acetate monomer, an acrylic ester monomer, and a monomer having a hydroxyl or amine functionality; mixing the solvent, crosslinker, and polymer to form an adhesive formulation; and coating the formulation to form the pressure sensitive adhesive layer. The formulation may be coated onto a film. The adhesive layer may have a coating weight from 5 to 60 gsm.

BRIEF DESCRIPTION OF DRAWINGS

The invention is described in detail below with reference to the appended drawing, wherein like numerals designate similar parts.

DETAILED DESCRIPTION OF THE INVENTION

The present disclosure generally relates to pressure sensitive adhesives that are solvent-based and low outgassing, and that retaining excellent adhesion and tack. The solvent-based pressure sensitive adhesives are produced from a formulation comprising a polymer, a solvent, and a crosslinker. The polymer may comprise a vinyl acetate monomer, an acrylic ester monomer, and a monomer having a hydroxyl or amine functionality. The formulation may be coated on a liner, film, or facestock, described further herein, to form a pressure sensitive adhesive layer. The pressure sensitive adhesive layer may be part of a label, e.g., a label that is applied to an electronic. The adhesive may release less than 2000 ng/cm$^2$ outgas as measured according to ASTM E 595 (1993), e.g., less than 1000 ng/cm$^2$, less than 500 ng/cm$^2$, or less than 400 ng/cm$^2$.

The present disclosure also relates to methods of making the pressure sensitive adhesive. The method comprises providing a solvent, a crosslinker, and a polymer comprising a vinyl acetate monomer, an acrylic ester monomer, and a monomer having a hydroxyl or amine functionality; mixing the solvent, crosslinker, and polymer to form an adhesive formulation; and coating the formulation to form the pressure sensitive adhesive layer.

As discussed above, it is desirable to reduce outgassing of pressure sensitive adhesives, especially for those used on electronic devices. While reduction of outgassing during all stages of the pressure sensitive adhesive production and use is desirable, for electronic devices, reduction of outgassing when the electronic device is used is especially desirable. Such a reduction in outgassing when the electronic device is in use is important because even after drying, some pressure sensitive adhesives may contain residual monomers. Thus, when the electronic devices is heated during use, such residual monomers may be released. The inventors have found that the solvent-based pressure sensitive adhesive described herein surprisingly and unexpectedly has relatively low outgassing compared to both conventional solvent-based and water-based pressure sensitive adhesives. Without being bound by theory, it is believed that the outgassing of the adhesive, after coating, is low because of the strength of the polymer backbone. Because of the strength of the backbone, there is a low residual monomer/oligomer content, e.g., a reduced amount of monomers/oligomers are freely available. A low free monomer/oligomer content allows fewer monomers/oligomers to escape at high temperature, advantageously leading to reduced outgassing. Importantly, the solvent-based pressure sensitive adhesive described herein achieves low outgassing while still retaining excellent adhesion and tack. For example, the solvent-based pressure sensitive adhesive may still retain excellent adhesion and tack at temperatures up to 80° C. Additionally, it is desirable that the PSA has clean bonding and uses a low-silicone or silicone free liner to reduce or prevent silicon contamination of the electronic device.

Solvent-Based Pressure Sensitive Adhesive Formulation

The pressure sensitive adhesive described herein is solvent-based and is formed from a formulation comprising a polymer, a solvent, and a crosslinker. The polymer comprises a vinyl acetate monomer, and acrylic ester monomer, and a monomer having a hydroxyl or amine functionality. The solvent may be a single solvent or a mixture of solvents. The formulation may also comprise a catalyst. Exemplary ranges for the monomers, solvent, crosslinker, and optional catalyst are shown below.

TABLE 1

| Component | Range 1 (wt. %) | Range 2 (wt. %) | Range 3 (wt. %) | Range 4 (wt. %) |
| --- | --- | --- | --- | --- |
| Polymer | 10-60 | 10-50 | 12-47 | 15-45 |
| Solvent(s) | 10-80 | 10-70 | 10-60 | 10-50 |
| Cross-linker | 0.05-5 | 0.05-4.5 | 0.05-4 | 0.05-3 |
| Catalyst | 0-5 | 0.1-4.5 | 0.5-4 | 0-3 |

The polymer may comprise from 10 to 90 wt. % vinyl acetate, e.g., from 10 to 70 wt. %, from 10 to 40 wt. % acrylic ester, e.g., from 10 to 30 wt. %, and from 5 to 50 wt. % monomer having hydroxyl or amine functionality, e.g., from 5 to 40 wt. %.

The acrylic ester may be an ester of acrylic acid including the following molecular formula:

The acrylic ester may be a $C_2$-$C_{20}$ ester of acrylic acid, including linear, branched, and aromatic, esters of acrylic acid. The monomer having hydroxyl or amine functionality may be a hydroxyl terminated polyether or an amine terminated polyether. For example, the monomers having hydroxyl functionality may be those disclosed in US Pub. No. 2012/0225992, the entirety of which is incorporated by reference. Specific representative hydroxyl-functional monomers include Other hydroxyl-containing monomers including hydroxyalkyl(meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, as well as vinyl alcohol and allyl alcohol, and polymers including ethylene oxides units, propylene oxide units, butylene oxide units, and combinations thereof.

In some aspects, the polymer may be free of methacrylate monomers and may be free of additional monomers beyond those described herein. For example the polymer may comprise less than 5 wt. % methacrylate monomers, e.g., less than 3 wt. %, less than 1 wt. %, less than 0.5 wt. %, less than 0.1 wt. %, or less than 0.05 wt. %. Additionally, the pressure sensitive adhesive described herein may be a solvent-based pressure sensitive adhesive. The formulation described herein is not a water-based formulation. In some cases, the formulation may comprise less than 0.1 wt. % water, if present at all, e.g., less than 0.01 wt. % water or less than 0.001 wt. % water. If present, the water content may be measured by any method known in the art for determining trace amounts of water in a sample, e.g. the Karl Fischer titration method.

The solvent may be a single solvent or a mixture of solvents. The solvent suitably is any solvent that is compatible with the chosen monomers. In some aspects, the solvent can include esters, hydrocarbons such as hexane, ketones and aromatic hydrocarbons. Further examples of solvents include ethyl acetate, butyl acetate, methoxypropylacetate, acetone, methyl ethyl ketone, methyl isobutyl ketone, cyclohexanone, toluene, xylene, solvent naptha 100, and mixtures thereof. In further aspects, the solvent may be toluene, ethyl acetate, isopropyl alcohol, hexane, butyl acetate, and combinations thereof. In aspects where each of the toluene, ethyl acetate, isopropyl alcohol and hexane are included, the toluene may be present from 20 to 80 wt. %, based on the total weight of solvent, e.g., from 20 to 50 wt. %. The ethyl acetate may be present from 20 to 80 wt. % based on the total weight of solvent, e.g., from 20 to 40 wt. %. The isopropyl alcohol may be present from 10 to 40 wt. % based on the total weight of solvent, e.g., from 10 to 20 wt. %. The hexane may be present from 10 to 30 wt. % based on the total weight of solvent, e.g., from 10 to 20 wt. %.

The polymer may have a glass transition temperature of at least −40° C., e.g., at least −35° C. or at least −30° C. In terms of upper limits, the polymer may have a glass transition temperature of −10° C. or less, e.g., −11° C. or less, or −12° C. or less. In terms of ranges, the polymer may have a glass transition temperature from −40 to −10° C., e.g., from −35 to −11° C. or from −30 to −12° C. In general, the lower the glass transition temperature, the better the tack but the worse the modulus value. By including the monomers described herein, which have different glass transition temperatures, the polymer will have a good balance of tack and modulus value.

The polymer may have a weight average molecular weight of at least 25,000 g/mol, e.g., at least 35,000 g/mol or at least 45,000 g/mol. In terms of upper limits, the polymer may have a weight average molecular weight of 400,000 g/mol or less, e.g., 300,000 g/mol or less or 200,000 g/mol or less. In terms of ranges, the polymer may have a weight average molecular weight from 25,000 g/mol to 400,000 g/mol, e.g., from 35,000 g/mol to 300,000 g/mol or from 45,000 g/mol to 200,000 g/mol.

The polymer may have a number average molecular weight of at least 25,000 g/mol, e.g., at least 35,000 g/mol or at least 45,000 g/mol. In terms of upper limits, the polymer may have a number average molecular weight of 400,000 or less, e.g., 300,000 or less or 200,000 or less. In terms of ranges, the polymer may have a number average molecular weight from 25,000 g/mol to 400,000 g/mol, e.g., from 35,000 g/mol to 300,000 or from 45,000 to 200,000 g/mol.

The polymer may have a polydispersity index of at least 1, e.g., at least 1.01 or at least 1.05. In terms of upper limits, the polymer may have a polydispersity index of no more than 10, e.g., no more than 9 or no more than 8. In terms of ranges, the polymer may have a polydispersity index from 1 to 10, e.g., from 1.01 to 9 or from 1.10 to 8. In some aspects, the polydispersity index is approximately 1.

The ratio of polymer to crosslinker may be at least 20:1, e.g., at least 30:1, at least 60:1 or at least 100:1. The inventors have surprisingly and unexpectedly found that a relatively low amount of crosslinker is needed to crosslink the polymer while still achieving low residual monomers and thus low outgassing of the coated adhesive. As such, the crosslinker is preferably present from 0.05 to 5 wt. %, based on the total weight of the formulation, e.g., from 0.5 to 3 wt. %, from 0.3 to 2 wt. %, or from 0.17 to 1 wt. %. As further described below, embodiments of the present invention utilize a number of different crosslinkers. The amount of crosslinker present in the formulation may be determined based on the specific crosslinker used.

The crosslinker may be a polymeric isocyanate, an epoxy, or a melamine resin. Suitable isocyanate crosslinking agents are monomeric or oligomeric molecules having 2 or more N=C=O groups. Typically, the —N=C=O groups will crosslink between both hydroxyl (—OH) groups and amino (—NH2 or —NH—) groups on the polyamide. Polyisocyanate compounds useful for crosslinking the polyamide of Formula (I) include aliphatic and aromatic isocyanate compounds having an isocyanate functionality of at least 2. The polyisocyanate compounds may also contain other substituents which do not substantially adversely affect the reactivity of the —N=C=O groups during crosslinking of the polyamide of Formula (I). The polyisocyanate compound can also comprise mixtures of both aromatic and aliphatic isocyanates and isocyanate compounds having both aliphatic and aromatic character. Non-limiting examples of polyisocyanate crosslinking agents include ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane4,4'-diisocyanate, p-phenylene diisocyanate, m-phenylene diisocyanate, xylylene diisocyanate, 1,4-naphthalene diisocyanate, 1,5-naphthalene diisocyanate, diphenyl4,4'-diisocyanate, azobenzene4,41-diisocyanate, diphenylsulphone4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, tetramethylxylene diisocyanate, poly((phenylisocyanate)-co-formaldehyde) and mixtures thereof.

The epoxy crosslinker generally has a plurality of epoxy groups which crosslink the polymer. An exemplary reaction scheme is shown below.

The polyfunctional epoxy crosslinking agent may have the general formula:

wherein A is a polyfunctional group of average valence of at least about 2, n is a number having an average of at least about 2, and R is a hydrocarbyl radical. A may be aliphatic or, preferably, aromatic. Aliphatic type epoxy crosslinking agents include the glycidyl ethers of polyhydroxy, polythio and polycarboxy aliphatic compounds, particularly polyglycidyl ethers of polyalcohols, such as, for example, diglycidyl ethers of $\alpha,\omega$-diols, including butanediol diglycidyl ether, hexanediol diglycidyl ether, paracyclohexyldimethanol diglycidyl ether, neopentyl glycol diglycidyl ether, triglycidyl ethers of triols, including trimethylolpropane triglycidyl ether and glycerol triglycidyl ether, and tetraglycidyl ethers of tetrols including pentaerythritol tetraglycidyl ether and the like. The epoxy crosslinker may also be an epoxidized olefin compound such as, for example, epoxidized soybean oil, epoxidized linseed oil, epoxidized cycloolefins and cyclic dienes, and cycloaliphatic epoxies such as vinyl cyclohexene dioxide and bis(3,4-epoxy-6-methylcyclohexyl methyl) adipate.

The melamine resin crosslinker may be melamine formaldehyde, alkyl melamine resin, alkyl etherified melamine resin, alkoxy methyl melamine resin, and combinations thereof.

The catalyst may be tin, platinum, or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, and various organic peroxides such as benzoyl peroxide and 2,4-dichlorobenzoyl peroxide. Metal complexes of platinum and rhodium may also be used as the catalyst. Amines and amines derivatives such as diethylene triamine, triethylene tetramine and ethanol amine, as well as amine precursors such as the isocyanate compounds and amine-functional silanes such as gamma-aminopropyl triethoxy silane may also be used. The amine salts of carboxylic acids may also be used. In one aspect, the catalyst is a peroxide, such as benzoyl peroxide.

Method of Forming Solvent-Based Pressure Sensitive Adhesive

The present invention also relates to methods for producing solvent-based pressure sensitive adhesives. The methods include providing a solvent, a crosslinker, and a polymer comprising a vinyl acetate monomer, an acrylic ester monomer, and a monomer having a hydroxyl or amine functionality; mixing the solvent, crosslinker, and polymer to form an adhesive formulation; and coating the formulation to form the pressure sensitive adhesive layer. The solvent, crosslinker, and polymer are described above. The polymer may be dispersed in the solvent, and the dispersed polymer may be provided to a reactor, e.g., a stainless steel reactor. The reactor may be purged with nitrogen through the reaction. Crosslinker may then be added to the reactor, and catalyst may optionally be added. The mixture may then be stirred until homogenized of the polymer and crosslinker. The mixture may be stirred at a suitable rate and for a suitable time for such homogenization to occur. The stir time can be, for example and without limitation, at least 5 minutes, at least 6 minutes, at least 7 minutes, at least 8 minutes, at least 9 minutes, at least 10 minutes, at least 15 minutes, at least 20 minutes, at least 25 minutes, or at least 30 minutes. For example, the stirring may be at a rate of 500 RPM for 10 minutes. The mixture may then be allowed to sit, without stirring for additional time, such as 15 minutes, to allow the reaction to complete.

The formulation may then be coated onto a substrate, such as a liner. In some aspects, the liner is a low siliconized, polyethylene terephthalate liner. The formulation may be coated using a solvent coater by knife over roll, slot die, or comma coating. The speed of the solvent coater may vary, and may range from 5 to 50 meters per minute, e.g., from 10 to 40 meters per minute, or from 15 to 25 meters per minute. Generally, the only restraint on the solvent coating speed is that there is no solvent residue after coating, e.g., less than 0.5%, less than 0.25%, less than 0.1%, or no measurable solvent residue. The formulation may be coated to form an adhesive layer having a coat weight of at least 5 grams per square meter (gsm), e.g., at least 10 gsm or at least 15 gsm. In terms of upper limits, the formulation may be coated to form an adhesive layer having a coat weight of 150 gsm or less, e.g., 125 gsm or less, or 100 gsm or less. In terms of ranges, the formulation may be coated to form an adhesive layer having a coat weight from 5 to 150 gsm, e.g., from 10 to 125 gsm or from 15 to 100 gsm, depending on the end use of the adhesive layer. In some embodiments of the present invention, the coat weight of the adhesive layer may even greater than 150 gsm, such as when glass bubbles or microbeads are included as additives.

The solvent coater may be an oven having multiple temperature zones, e.g., at least 2 zones, at least 3 zones, at least four zones, at least five zones, or at least six zones. The temperature zones may range from 30 to 205° C., e.g., from 40 to 190° C. or from 60 to 180° C. The temperature may increase from the first to last zone, though multiple zones may be at the same temperature.

Once coated, the adhesive may be transferred to a film, dried, and laminated onto the film. In some aspects, the film may be a multilayer film and the film may be used as a label. In further aspects, the laminate may be a tape, such as a transfer tape, double linered transfer tape, double coated tape, and double linered double coated tape. The double coated tape may include a scrim, film carrier, tissue, nonwoven, and/or foil. The double coated tape may include a release line, or two or more liners. The laminate may also be a single coated tape which also contains a liner. Finally, the laminate may be a self-wound tape, which would generally not contain a liner. The tapes may be used in various applications, including automotive interior cabin applications, aerospace applications, auto infotainment applications, hard disk drive applications, flooring applications, seaming tape applications, and window glazing tape applications.

The adhesive layer may be dried in an oven, for a predetermined drying time. The adhesive layer may be dried prior to laminating the adhesive onto the film. The drying oven may have a temperature of greater than 100° C. The drying time can be at least 2 minutes, at least 4 minutes, at least 6 minutes, at least 8 minutes, at least 10 minutes, at least 15 minutes, at least 20 minutes, at least 25 minutes, at least 30 minutes, at least 40 minutes, at least 50 minutes, or at least 1 hour.

The present invention also relates to methods of applying a label to an electronic device. The methods include providing an electronic device defining an outer surface, and a label in accordance with an embodiment. The methods further include adhering the label to the outer surface of the electronic device, thereby applying the label to the electronic device.

The labels can be adhered to one or more electronic devices in a batch, continuous, or semi-continuous fashion. Prior to application, one or more liners can be removed from the labels to thereby expose the adhesive face of the labels. The adhesive face and label is then contacted with the electronic device and the labels applied thereto. Adhering may also include one or more operations of pressing or otherwise applying a pressing force against the label to promote contact and/or adhesion with the electronic device.

Labels

The present invention also relates to labels that include a pressure sensitive adhesive of the present invention. The labels may be multilayer labels. The labels may include a layer of facestock for receiving printed indicia, and a layer of pressure sensitive adhesive having a composition as described above. The labels can also include one or more facestock layers, one or more optional print layers, one or more adhesive layers, and optionally a liner layer. In some embodiments, the labels further include a silicone layer between the facestock layer and the adhesive layer. The silicone layer can be present in the form of a silicone coating on the facestock. In some embodiments, the silicone layer and the facestock layer are together a silicone-coated paper. The present subject matter may be utilized in labels free of print, but in many embodiments, the labels comprise one or more regions of print.

The facestock and adhesive layers can be positioned directly adjacent to one another or can have one or more additional layers in between them. Additional layers can include, for example, one or more coating layers, support layers, print layers, reflective layers, laminate layers, or others. Any one or more of the layers can also include two or more sublayers, each with different compositions, configurations, and functions.

The facestock can include, for example, paper facestock, cardboard facestock, plastic facestock, a multilayer laminated facestock including both paper and plastic layers, or any other materials that are commonly used in the industry. The multilayer laminate facestock can include a paper layer overlying a plastic layer. The plastic layer of the multilayer laminate facestock can be extruded or otherwise coated onto the paper layer. The paper layer can include, for example, high gloss paper, semi-gloss paper, lithographic paper, or electronic data processing (EDP) paper; and can be configured for use in, for example, multi-color printing, typewriter printing, or inkjet printing. The plastic layer can include, for example, polyesters, such as PET; polyolefins, such as polypropylene (PP), ethylene-propylene copolymers, polyethylene (PE); and other materials. Other polymeric film materials include urethane based polymers such as polyether urethane and polyester urethane; amide based polymers including polyether polyamide copolymers; acrylic based polymers including a polyacrylate, and ethylene/vinyl acetate copolymer; polyester based polymers including a polyether polyester; a vinyl chloride; a vinylidene chloride; a polystyrene; a polyacrylonitrile; a polycarbonate; a polyimide; or the like. The facestock can include a flexible facestock. The facestock can include a transparent polymeric film. In certain applications, it can be useful to utilize "shrink" films or oriented films as a facestock layer. The present subject matter includes, for example, biaxially oriented films such as PET as a facestock layer.

In some embodiments, the label further includes print disposed on the layer of facestock. The print can include layers or regions of ink, dyes, pigments, or like materials. As will be understood, "dye" and like terms mean a visible light absorbing compound present in a molecularly dispersed or dissolved form. "Pigment" and like terms mean a visible light absorbing material or compound that is present in a non-molecularly dispersed or particulate form. "Ink" and like terms means a coatable or printable formulation containing a dye and/or pigment. Although the present subject matter is largely directed toward labels including visually perceptible print, it is contemplated that the labels may include print that is exclusively or primarily indicative under UV light or other conditions.

The adhesive layer can be applied directly adjacent to, and in contact with, the facestock. There can be intervening layers between the adhesive layer and the facestock. The label can include two or more layers of adhesive and/or facestock. The adhesive layer of the label can be coated onto the facestock with a coat weight as described herein. In some aspects, the adhesive layer is free of tin.

The adhesive layer of the label can be coated onto the facestock with a thickness of, for example, from 750 microns to 2500 microns, e.g., from 750 microns to 2250 microns, from 1000 microns to 2000 microns, from 1000 microns to 1750 microns, or from 1250 microns to 1750 microns. In terms of upper limits, the adhesive layer can have a thickness of less than 2500 microns, less than 2250 microns, less than 2000 microns, less than 1750 microns, or less than 1500 microns. In terms of lower limits, the adhesive layer can have a thickness of at least 750 microns, at least 1000 microns, at least 1250 microns, at least 1500, or at least 1750 microns.

The present subject matter can include the incorporation of one or more clear or transparent layers in any of the label constructions described herein. The present subject matter can also include the incorporation of one or more metallic layers or metal foils in any of the label constructions described herein. It is also contemplated that the label constructions can also include combinations of one or more transparent layers and one or more metallic layers. In some embodiments, the label is a clear on clear label having a laminate composition that includes a transparent biaxially oriented polypropylene (BOPP) film, a transparent pressure sensitive adhesive layer, and a transparent PET liner.

In some embodiments, the label further includes a liner disposed on the layer of pressure sensitive adhesive. A releasable liner can be positioned adjacent to the adhesive layer such that the adhesive layer is disposed, or sandwiched, directly or indirectly between the bottom surface of the facestock and the releasable liner. The releasable liner may function as a protective cover such that the release liner remains in place until the label is ready for attachment to an object. If a liner or release liner is included in the label, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the adhesive layer. Prior to application of the label to a surface of interest, the liner is removed to thereby expose the adhesive face of the label. The liner can be in the form of a single sheet. Alternatively, the liner can be in the form of multiple sections or panels. In some aspects, the liner is free of tin.

Other additives can be added to one or more of the pressure sensitive adhesive, facestock, or liner layers to obtain a certain desired characteristic. These additives can include, for example, one or more waxes, surfactants, talc, powdered silicates, filler agents, defoamers, colorants, antioxidants, UV stabilizers, luminescents, crosslinkers, buffer agents, anti-blocking agents, wetting agents, matting agents, antistatic agents, acid scavengers, flame retardants, processing aids, extrusion aids, and others.

The present invention also relates to labeled surfaces that include a pressure sensitive adhesive of the present invention. The labeled surfaces include a surface having an outer face, and a label as described above that is adhered to the outer face of the surface. In some embodiments, the surface is an element of an electronic device.

In some embodiments, the outer surface of the electronic device includes plastic. The outer surface can include or be formed from any suitable polymer or mixture of polymers. The polymer or mixture of polymers can include, for example, PET, recycled polyethylene terephthalate (rPET), high density polyethylene (HDPE), polyvinyl chloride (PVC), poly lactic acid (PLA), cellulose, biopolymer films, low density polyethylene (LDPE), PP, polystyrene (PS), polyesters, or other types of polymers or plastics. In some embodiments, the plastic includes PET.

Performance of the Solvent-Based Adhesive Layer

Pressure sensitive adhesives are typically characterized by the ability of the adhesive to withstand creep or shear deformation, while exhibiting adequate tack and peel adhesion properties. Accordingly, a low peel adhesion and tack significantly limits applicability of the adhesive in pressure sensitive constructions, particularly for labels. Peel adhesion is the average force required to remove an adhesive laminated under specified conditions on a substrate, from the substrate at constant speed and at a specified angle. Peel adhesion evaluations can be performed by testing 180° stainless steel peel for 20 minutes and for 24 hours according to FTM-1 and FTM-2 (Test Resources, FINAT Test Methods & Equipment Comments). The target for each peel test is generally at least 16 N/25 mm. In some aspects, the solvent-based pressure sensitive adhesive has a 180° peel at 20 minutes and 24 hours of at least 16 N/mm.

Also, the solvent-based pressure sensitive adhesive provided herein have surprisingly been found to provide enhanced loop tack strength. Loop tack is the average force required to separate an adhesive from a surface shortly after having been brought into contact with the surface under a load equal only to the weight of the pressure-sensitive adhesive. The target for the loop tack is generally at least 10 N/25 mm. The solvent-based pressure sensitive adhesive described herein may have a stainless steel loop tack of at least 10 N/25 mm, e.g., at least 11 N/25 mm or at least 12 N/25 mm, according to FTM-9 (Test Resources, FINAT Test Methods & Equipment Comments).

The solvent-based pressure sensitive adhesive may be removable, and may leave no adhesive residue behind. Such lack of residue may be advantageous if the label is removed and replaced on the device or used on another device.

As described herein, an advantage to the solvent-based pressure sensitive adhesives described herein is their low outgassing once dried and used on an electronic device. The outgassing may be measured by ASTM E 595 (1993). The adhesive may release less than 2000 ng/cm$^2$ outgas, e.g., less than 1000 ng/cm$^2$, less than 500 ng/cm$^2$ or less than 400 ng/cm$^2$. The following embodiments are contemplated. All combinations of features and embodiment are contemplated.

Embodiment 1

A solvent-based pressure sensitive adhesive formulation comprising: a polymer comprising a vinyl acetate monomer, an acrylic ester monomer, and a monomer having a hydroxyl or amine functionality; a solvent; and a crosslinker.

Embodiment 2

An embodiment of embodiment 1, wherein the polymer has a glass transition temperature from −40 to −10° C.

Embodiment 3

An embodiment of embodiments 1-2, wherein the polymer has a weight average molecular weight from 25,000 to 400,000 g/mol.

Embodiment 4

An embodiment of embodiments 1-3, wherein the polymer has a number average molecular weight from 25,000 to 400,000 g/mol.

Embodiment 5

An embodiment of embodiments 1-4, wherein the polymer has a polydispersity index from 1 to 10.

Embodiment 6

An embodiment of embodiments 1-2, wherein the polymer is present from 10 to 60 wt. %, based on the total weight of the formulation.

Embodiment 7

An embodiment of embodiments 1-6, wherein the polymer comprises from 10 to 90 wt. % polyvinyl acetate monomer, based on the total weight of the polymer.

Embodiment 8

An embodiment of embodiments 1-7, wherein the polymer comprises from 10 to 40 wt. % acrylic ester monomer, based on the total weight of the polymer.

Embodiment 9

An embodiment of embodiments 1-8, wherein the polymer comprises from 5 to 50 wt. % monomer having a hydroxyl or amine functionality, based on the total weight of the polymer.

Embodiment 10

An embodiment of embodiments 1-9, wherein the crosslinker is present from 0.01 to 2 wt. %, based on the total weight of the formulation.

Embodiment 11

An embodiment of embodiments 1-10, wherein the solvent is present from 40 to 90 wt. %, based on the total weight of the formulation.

Embodiment 12

A solvent-based pressure sensitive adhesive comprising a polymer and a crosslinker, wherein the polymer comprises a vinyl acetate monomer, an acrylic ester monomer, and a monomer having a hydroxyl or amine functionality; and further wherein the adhesive releases less than 2000 ng/cm$^2$ volatile organic components.

Embodiment 13

An embodiment of embodiment 12, wherein the polymer has a glass transition temperature from −40 to −10° C.

Embodiment 14

An embodiment of embodiments 12-13, wherein the polymer has a weight average molecular weight from 25,000 to 400,000 g/mol.

Embodiment 15

An embodiment of embodiments 12-14, wherein the polymer has a number average molecular weight from 25,000 to 400,000 g/mol.

Embodiment 16

An embodiment of embodiments 12-15, wherein the polymer has a polydispersity index from 1 to 10.

Embodiment 17

An embodiment of embodiments 12-16, wherein the polymer comprises from 10 to 90 wt. % polyvinyl acetate monomer, based on the total weight of the polymer.

Embodiment 18

An embodiment of embodiments 12-17, wherein the polymer comprises from 10 to 40 wt. % acrylic ester monomer, based on the total weight of the polymer.

Embodiment 19

An embodiment of embodiments 12-18, wherein the polymer comprises from 5 to 50 wt. % monomer having a hydroxyl or amine functionality, based on the total weight of the polymer.

Embodiment 20

An embodiment of embodiments 12-19, wherein the crosslinker is present from 0.05 to 6 wt. %, based on the total weight of the adhesive.

Embodiment 21

A label comprising: a film and a pressure sensitive adhesive layer formed of any of embodiments 12-20.

Embodiment 22

An embodiment of embodiment 21, wherein the adhesive layer has a coating weight from 5 to 60 gsm.

Embodiment 23

An embodiment of embodiments 21-22, wherein the adhesive release less than 2000 ng/cm$^2$ outgas as measured according to ASTM E 595 (1993).

Embodiment 24

A method for producing a pressure sensitive adhesive layer, the method comprising: providing a solvent, a crosslinker, and a polymer comprising a vinyl acetate monomer, an acrylic ester monomer, and a monomer having a hydroxyl or amine functionality; mixing the solvent, crosslinker, and polymer to form an adhesive formulation; and coating the formulation to form the pressure sensitive adhesive layer.

Embodiment 25

An embodiment of embodiment 24, wherein the formulation is coated onto a film.

Embodiment 26

An embodiment of embodiments 24-25, wherein the adhesive layer has a coating weight from 5 to 60 gsm.

The present invention will be better understood in view of the following non-limiting examples.

EXAMPLES

Example 1. Variation of Cross-Linker Amount

A base polymer comprising 15 wt. % vinyl acetate, 10 wt. % acrylic ester, and 5 wt. % hydroxyl functional monomers (LOCTITE DURO-TAK® EU 788, manufactured by Henkel Corporation) was dispersed in 14 wt. % toluene and 56 wt. % ethyl acetate to form a mixture. All weight percentages are based on the total weight of the mixture. Accordingly, the base polymer is present at 30 wt. % of the mixture. The base polymer comprises approximately 50 wt. % vinyl acetate, approximately 33.3 wt. % acrylic ester and approximately 16.7 wt. % hydroxyl functional monomers. The mixture was added to a stainless steel reactor. Varied amounts of crosslinker (an aromatic polyisocyanate) were then added to the reactor, as shown below in Table 2. The mixture was stirred at 500 rpm and purged with nitrogen. The stirring was maintained for 10 minutes. Once stirring was stopped, the mixture was allowed to sit for 15 minutes. The reaction was conducted at a temperature from 20 to 30° C. Each polymer had a glass transition temperature between −40 and −10° C.

Once formed, the mixture was coated via a solvent coater with a coating speed of 20 meters per minute. The mixture was coated onto a low siliconized polyethylene terephthalate liner at a coat weight of 30 grams per square meter (gsm). The mixture was then transferred, dried by using a temperature zoned oven, and laminated to a multilayered film.

The adhesive was then tested for adhesion, tack, and removability in accordance with FTM 1, FTM 2 and FTM 9 (Test Resources, FINAT Test Methods & Equipment Comments), described generally below.

FTM 1: Peel Adhesion (180°) at 300 mm per minute. This test method quantifies the performance of adhesion or peelability of self-adhesive pressure sensitive materials. Peel adhesion is the force required to remove pressure sensitive coated material, which has been applied to a standard test plate under specified conditions from the plate at a specified angle and speed. Test strips should be 25 mm wide and have a minimum length of 175 mm in the machine direction. The backing material is removed from each strip and the adhesive coated facing material is placed, adhesive side down, on to a clean test plate using light finger pressure and follow sample preparation procedures. The test plate and strip are fixed in the machine so that the angle of peel is 180°. The machine is set at 300 mm per minute jaw separation rate. The machine load averaging function is set so that it averages data—taking more than five readings at 10 mm intervals from the center section of each test strip and averaging them. Peel adhesion (180°) is the average result for the strips tested in Newtons per 25 mm width. All 100 Series Testers can set the data to be displayed in Force/width.

FTM 2: Peel Adhesion (90°) at 300 mm per minute. The purpose of this test is to compare the adhesive responses of different laminates. Measuring peel adhesion at 90° normally gives a lower value than at 180° and allows values to be measured for materials normally giving paper teat. Peel adhesion is the force required to remove pressure sensitive coated material, which has been applied to a standard test plate under specified conditions from the plate at a specified angle and speed. Adhesion is measured 20 minutes and 24 hours after application, the latter being considered as the ultimate adhesion. Test strips should be 25 mm wide and have a minimum length of 175 mm in the machine direction. The test plate and strip are fixed into the horizontal support, which is secured in the bottom jaw of the tester. The machine is set at 300 mm per minute jaw separation rate. The machine load averaging function is set to average data. Peel adhesion (90°) is the average result for the strips tested in Newtons per 25 mm width.

FTM 9: Loop Tack Measurement. Loop tack tests provide the means of assessing the most important and yet the hardest to measure property of pressure sensitive materials, the tack. This method allows the end user to compare the "initial grab" or "application tack" of different laminates and can be extremely useful to those working with automatic labeling equipment here this property is of particular importance. The loop tack value of a pressure sensitive material is the force required to separate, at a specified speed, a loop of material (adhesive outermost) which has been brought into contact with a specified area of a standard surface.

The two ends of the adhesive coated facing material strip are formed into a loop (adhesive surface outward) by bringing the two ends together. The ends of the loop are clamped at a distance of 10 mm into the top jaw of the tester leaving the loop hanging vertically downwards. The sides of the jaw should be protected from the adhesive coating. The glass plate is clamped in the lower jaw. The loop is positioned into contact with the glass plate at a speed of 300 mm per minute. When full contact over the glass plate has been achieved (25 mm×25 mm) the direction of the machine is immediately reversed to allow separation to take place at a speed of 300 mm per minute. The maximum force necessary to completely separate each loop from the glass plate is recorded. The strips should be 22 mm wide and have a minimum length of 175 mm in the machine direction. Loop tack results per FTM 9 are reported in Newtons.

The results are shown below for Comparative Examples A-D and Inventive Example E.

TABLE 2

|  | Comp. Ex. A | Comp. Ex. B | Comp. Ex. C | Comp. Ex. D | Inv. Ex. E |
|---|---|---|---|---|---|
| Crosslinker (wt. %) | 0.85 | 0.68 | 0.34 | 0.51 | 0.17 |
| Adhesion 180° peel 20 min (SS) (N/25 mm) | 8.68 | 10.25 | 13.43 | 15.08 | 16.46 |
| Adhesion 180° peel 24 Hrs (SS) (N/25 mm) | 8.37 | 9.99 | 14.18 | 14.71 | 16.78 |
| Tack Loop tack (SS) | 7.85 | 9.52 | 11.77 | 13.47 | 12.42 |
| Removability | No adhesive residue | No adhesive residue | No adhesive residue | No adhesive residue | No adhesive residue |

The outgassing of volatile organic components from the adhesive of Inventive Example E was then tested according to ASTM E 595 (1993) and was found to be 319.73 ng/cm$^2$. The adhesives of Comparative Examples A-D were not tested for outgassing due to their lower than desirable adhesion and tack.

Example 2. Variation of Cross-Linker Amount

An adhesive was formed according to Inventive Example E, except that the coat weight was varied as shown below. The adhesion, tack, outgassing, and removability were tested as described above. The results are shown below in Table 3.

TABLE 3

|  | Inv. Ex. F | Inv. Ex. G | Inv. Ex. H |
|---|---|---|---|
| Coat weight (gsm) | 25 | 26 | 33 |
| Adhesion 180° peel 20 min (SS) (N/25 mm) | 16.25 | 16.74 | 17.31 |
| Adhesion 180° peel 24 Hrs (SS) | 16.55 | 16.87 | 17.55 |

TABLE 3-continued

|  | Inv. Ex. F | Inv. Ex. G | Inv. Ex. H |
|---|---|---|---|
| (N/25 mm) | | | |
| Tack | 15.11 | 15.27 | 15.11 |
| Loop tack (SS) | | | |
| Outgassing (ng/cm$^2$) | 319.3 | 356.22 | 377.22 |
| Removability | No adhesive residue | No adhesive residue | No adhesive residue |

As shown in Table 3, increased coat weight resulted in increased adhesion (peel and tack) while still maintaining acceptable outgassing.

Example 3. Variation of Coating Speed

An adhesive was formed according to Inventive Example E, except that the coating speed was varied as shown below. The adhesion, tack, outgassing, and removability were tested as described above. The results are shown below in Table 4.

TABLE 4

|  | Inv. Ex. I | Inv. Ex. J | Inv. Ex. K |
|---|---|---|---|
| Coating speed (meters/min) | 15 | 20 | 25 |
| Adhesion 180° peel 20 min (SS) (N/25 mm) | 16.51 | 17.45 | 16.79 |
| Adhesion 180° peel 24 Hrs (SS) (N/25 mm) | 18 | 20.52 | 20.59 |
| Tack Loop tack (SS) | 17.61 | 17.44 | 18.41 |
| Outgassing (ng/cm$^2$) | 217 | 266 | 281 |
| Removability | No adhesive residue | No adhesive residue | No adhesive residue |

As shown in Table 4, coating speed did not appreciably affect outgassing.

Example 4: Testing for Residual Reaction

The adhesives of Comparative Example B and Inventive Example E were tested for evidence of any residual reaction, which is a result of unreacted molecules of polymer and crosslinker, which may generate outgassing once the adhesive is applied to a substrate.

The testing with performed using a dynamic scanning calorimeter (DSC) to conduct thermogram analysis. Each adhesive sample was collected after curing and DSC was performed. Each sample was heated at a constant heating rate along with an inert reference and the heat flow from each sample and the reference was measured. Since the reference was inert, there was no change in heat flow. The adhesive samples, however, either absorb (endothermic) or release (exothermic) heat based on the type, which gives a signal of difference in heat flow measured from that of the reference. Detectors then calculate the level of heat flow.

Figure 1:
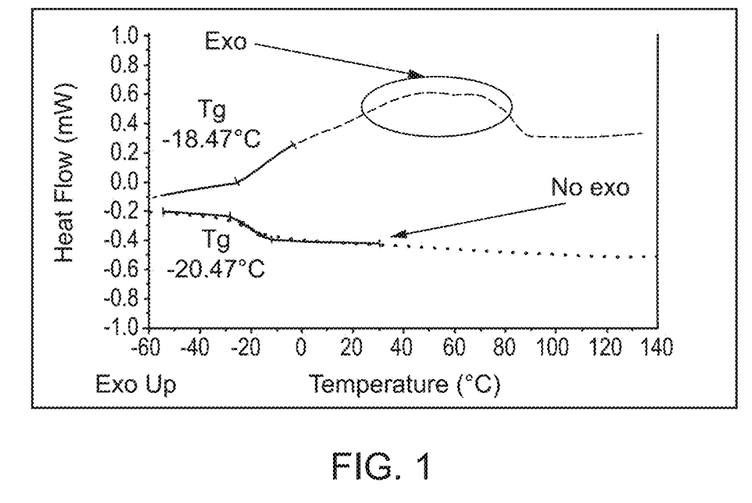
FIG. 1 is a graph of heat flow as measured by a dynamic scanning calorimeter in accordance with embodiments of the disclosure.

As shown in FIG. 1, the sample of Comparative Example B showed an exotherm, i.e., an increase in heat flow, indicating that there was a residual reaction in the sample and thus the adhesive would generate outgas. The sample of Inventive Example E did not show an exotherm and thus indicated that the adhesive was free from unreacted molecules of base polymer and crosslinker.

Example 5

The storage modulus of Comparative Example B and Inventive Examples I and J was tested with a rheometer using a Temperature ramp sweep frequency test. Storage modulus is a representation of the elastic behavior of the adhesive layer. The greater the value of the storage modulus, the greater the adhesion and shear. The results are shown below.

TABLE 5

| Example | Tg (° C.) | Peak Tan δ @Tg | Storage moulus (G')@25° C. (Pa) |
|---|---|---|---|
| Comp. Ex. B | −13.03 | 1.83 | 4.1E+04 |
| Inv. Ex. I | −17.1 | 2.05 | 1.2E+05 |
| Inv. Ex. J | −15.35 | 1.65 | 1.14E+05 |

Figure 2:
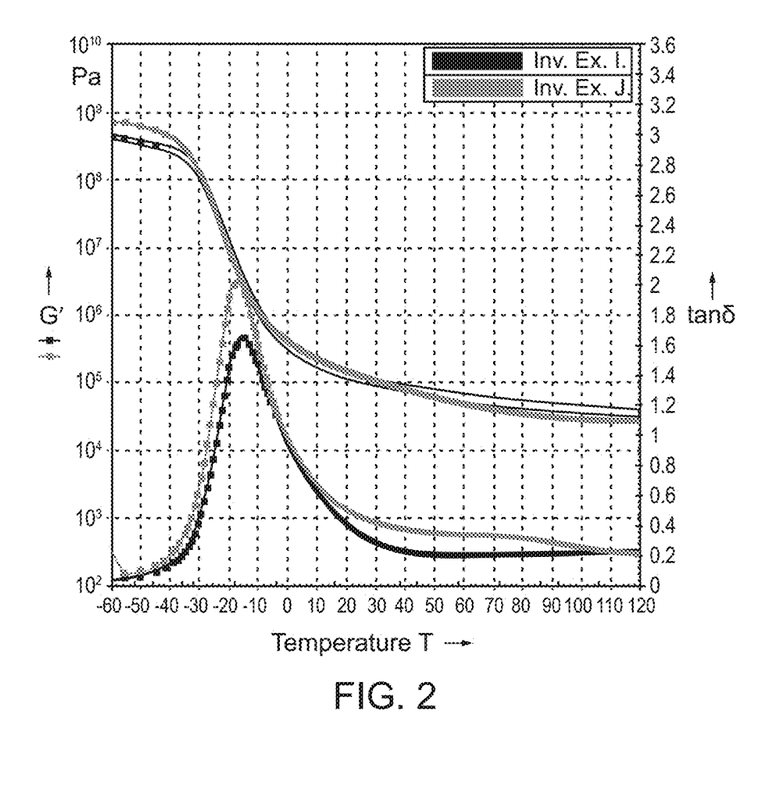
FIG. 2 is a rheology profile in accordance with embodiments of the disclosure.

As shown in Table 5, the storage modulus of Inventive Examples I and J was almost 4 times greater than that of Comparative Example B. The greater storage modulus supports the finding that peel adhesion is superior for Inventive Examples I and J as compared to Comparative Example B. A full rheology profile for Inv. Exs. I and J is shown in FIG. 2. The Peak Tan δ (measured through rheology) is a direct reflection on the physical performance of the label. A Peak Tan δ greater than 1.5 indicates acceptable physical performance with regard to removability, tack, and peel adhesion.

Example 6

Inventive Examples K and L were prepared using the same components and method as Example E except that the coating speed of Example L was greater than the coating speed of Example K. Comparative Example C was a commercially available adhesive. Each of Examples K and L and Comparative Example C were then tested for peel strength, loop tack, shear, removability on aluminum, and removability on stainless steel using the test methods described in Example 1. The results are shown below in Table 6.

TABLE 6

| Example | Comp Ex. C | Inv. Ex. K | Inv. Ex. L |
|---|---|---|---|
| 180° peel 20 min (ss) (N/25 mm) | 16.77 | 16.46 | 17.31 |
| 180° peel 24 hr (ss) (N/25 mm) | 17.80 | 17.78 | 17.55 |
| Loop tack (ss) (N/25 mm) | 8.63 | 12.42 | 15.11 |
| Shear (force stopped) | 26,260 | 25900 | 25,600 |
| Removability on Al   60° C. 16 hr   80° C. 2 hr | No residue | No residue | No residue |
| Removability on SS   60° C. 16 hr   80° C. 2 hr | No edge lift | No edge lift | No edge lift |
| Outgassing (ng/cm$^2$) | — | 319.73 | 377.22 |

While Comparative Example C had acceptable 180° peel, shear, and removability, it had unsatisfactory loop tack (below 10 N/25 mm). Inventive Examples K and L, however, had satisfactory loop tack in addition to satisfactory 180° peel, shear, and removability. Inventive Examples K and L had very good outgassing, measuring at well below the 2000 ng/cm$^2$ desired threshold. Inventive Examples K and L also passed the silicone and ionic component cleanliness tests. Finally, Inventive Examples K and L also passed the total tin test.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A solvent-based pressure sensitive adhesive formulation comprising:
    a polymer having a glass transition temperature from −40° C. to −10° C. and comprising the polymerized residues of:
    a. a vinyl acetate monomer, wherein the vinyl acetate monomer is present at a level of 10 to 15 wt. %, based on the total weight of the polymer;
    b. an acrylic ester monomer; and
    c. 5 wt % to 40 wt %, based on the total weight of the polymer, of a monomer having a hydroxyl or amine functionality;
    a solvent, wherein the solvent comprising 14 wt. % of toluene and 56 wt. % of ethyl acetate, based on the total weight of the solvent-based pressure sensitive adhesive formulation; and
    a crosslinker;
    wherein the polymer is present at a level of 15 to 45 wt. %, based on the total weight of the solvent-based pressure sensitive adhesive formulation and wherein the polymer has a polydispersity index from 1 to 10;
    wherein the crosslinker is present at a level of 0.05 to 0.17 wt. %, based on the total weight of the solvent-based pressure sensitive adhesive formulation;
    wherein the pressure sensitive adhesive formulation releases less than 2000 $ng/cm^2$ outgas as measured according to ASTM E 595 (1993); and
    wherein the acrylic ester monomer is present at a level of 10 to 40 wt. %, based on the total weight of the polymer.

2. The solvent-based pressure sensitive adhesive formulation of claim 1, wherein the polymer has at least one of: a weight average molecular weight from 25,000 to 400,000 g/mol or a number average molecular weight from 25,000 to 400,000 g/mol.

3. The solvent-based pressure sensitive adhesive formulation of claim 1, wherein the polymer comprises less than 5 wt. % methacrylate monomers.

4. A label comprising:
    a film and
    a pressure sensitive adhesive layer formed of the solvent-based pressure sensitive adhesive formulation of claim 1.

5. The label of claim 4, wherein the pressure sensitive adhesive layer has a coating weight from 5 to 60 gsm.

* * * * *